US010705946B2

(12) United States Patent
Bitoun

(10) Patent No.: US 10,705,946 B2
(45) Date of Patent: Jul. 7, 2020

(54) TECHNIQUES FOR REAL TIME SERVER TESTING IN A PRODUCTION ENVIRONMENT

(71) Applicant: A9.com, Inc., Palo Alto, CA (US)

(72) Inventor: Lionel Bitoun, Palo Alto, CA (US)

(73) Assignee: A9.COM, INC., Palo Alto, CA (US)

( * ) Notice: Subject to any disclaimer, the term of this patent is extended or adjusted under 35 U.S.C. 154(b) by 125 days.

(21) Appl. No.: 15/667,546

(22) Filed: Aug. 2, 2017

(65) Prior Publication Data

US 2017/0329696 A1 Nov. 16, 2017

Related U.S. Application Data

(63) Continuation of application No. 14/960,208, filed on Dec. 4, 2015, now Pat. No. 10,114,724.

(51) Int. Cl.
*G06F 11/36* (2006.01)
(52) U.S. Cl.
CPC ...... *G06F 11/3688* (2013.01); *G06F 11/3612* (2013.01)
(58) Field of Classification Search
CPC ............. G06F 11/3612; G06F 11/3672; G06F 11/3688; G06F 11/3692
See application file for complete search history.

(56) References Cited

U.S. PATENT DOCUMENTS

| 7,346,678 | B1 | 3/2008 | Zhu et al. | |
| 7,526,680 | B2 | 4/2009 | Mathew et al. | |
| 7,890,458 | B2* | 2/2011 | Dias | G06F 11/3414 |
| | | | | 707/610 |
| 8,769,340 | B2* | 7/2014 | Li | G06F 11/3688 |
| | | | | 714/25 |
| 8,793,660 | B2* | 7/2014 | Belihomji | G06F 11/3688 |
| | | | | 714/38.1 |
| 9,600,393 | B2* | 3/2017 | Golde | G06F 11/3612 |
| 9,923,892 | B1* | 3/2018 | Stone | H04L 67/02 |
| 10,114,724 | B1 | 10/2018 | Bitoun | |
| 2009/0240759 | A1 | 9/2009 | Miyamoto et al. | |
| 2012/0221893 | A1* | 8/2012 | Bai | H04L 43/50 |
| | | | | 714/27 |

(Continued)

OTHER PUBLICATIONS

Notice of Allowance issued in corresponding U.S. Appl. No. 14/960,208 dated May 3, 2017.

(Continued)

*Primary Examiner* — Joseph R Kudirka
(74) *Attorney, Agent, or Firm* — Hogan Lovells US LLP

(57) ABSTRACT

Techniques are provided for real-time server testing in a production environment. Unlike traditional testing frameworks, embodiments of the present invention enable a server in production to be tested using live messages received from users. This eliminates the need to design and write test scripts to cover various scenarios and enables the server to be tested under live conditions. A test controller executing on the server under test can receive message attributes from a test client that define the types of messages to be used for a particular test. The test controller can identify live messages as they are received by the server that match the message attributes. The messages can be processed by the server in real time and then tested according to message tests received from the test client.

20 Claims, 6 Drawing Sheets

(56) References Cited

U.S. PATENT DOCUMENTS

2017/0068608 A1   3/2017   Covell et al.

OTHER PUBLICATIONS

Non-Final Rejection issued in co-related U.S. Appl. No. 14/960,208 dated Aug. 11, 2017.
Final Rejection issued in co-related U.S. Appl. No. 14/960,208 dated Jan. 31, 2018.
Notice of Allowance issued in co-related U.S. Appl. No. 14/960,208 dated Oct. 12, 2018.

* cited by examiner

TECHNIQUES FOR REAL TIME SERVER TESTING IN A PRODUCTION ENVIRONMENT

CROSS REFERENCE TO RELATED APPLICATIONS

This application is a continuation of allowed U.S. application Ser. No. 14/960,208, now U.S. Pat. No. 10,114,724, issued Oct. 30, 2018, entitled "TECHNIQUES FOR REAL TIME SERVER TESTING IN A PRODUCTION ENVIRONMENT," filed Dec. 4, 2015; of which the full disclosure of this application is incorporated herein by reference for all purposes.

BACKGROUND

Application development is typically performed using a development architecture that reflects a traditional phased development and deployment approach. After being developed in a development environment, applications may be moved to a testing environment where it can be determined whether the applications are performing as expected. For example, a server may be tested by manually creating a number of test scripts which generate different requests that are designed to simulate scenarios the server is expected to encounter in deployment. The results of the test scripts can be analyzed to determine whether the server has passed the testing phase and is ready to be deployed to a production environment where the server will receive live requests from users. However, traditional testing approaches require significant manual effort to design and write appropriate test scripts to cover the various scenarios needed to effectively test the system. Additionally, for high volume servers, such testing approaches cannot simulate how the server will behave at load, when it is receiving potentially billions of requests.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the above-referenced and other deficiencies in conventional approaches to server testing in production environments. In particular, various embodiments provide for real time testing of servers in production (e.g., under live conditions) using messages received in production rather than simulated messages.

For example, techniques described herein include an improved testing framework for testing servers in production. As discussed above, traditional testing frameworks test servers in a testing environment using an external request source that generates artificial requests designed to simulate various test scenarios. Responses generated by the server under test can then be analyzed to determine whether the server has passed or failed that test. Unlike these traditional testing frameworks, embodiments of the present invention enable a server in production to be tested using live messages received from users. This eliminates the need to design and write test scripts to cover various scenarios and enables the server to be tested under live conditions. A test controller executing on the server under test can receive message attributes from a test client that define the types of messages to be used for a particular test. The test controller can identify live messages as they are received by the server that match the message attributes. The messages can be processed by the server in real time and then tested according to message tests received from the test client.

As used herein, content (also referred to herein as content items) may include any digital content, such as audio content, video content that includes a plurality of image data (e.g., still images) and accompanying audio data, and/or image content. The content can be encoded using various digital encoding formats and may be stored on various storage media. The content can include web-based and embeddable content.

Various other functions and advantages are described and suggested below as may be provided in accordance with the various embodiments.

Figure 1:
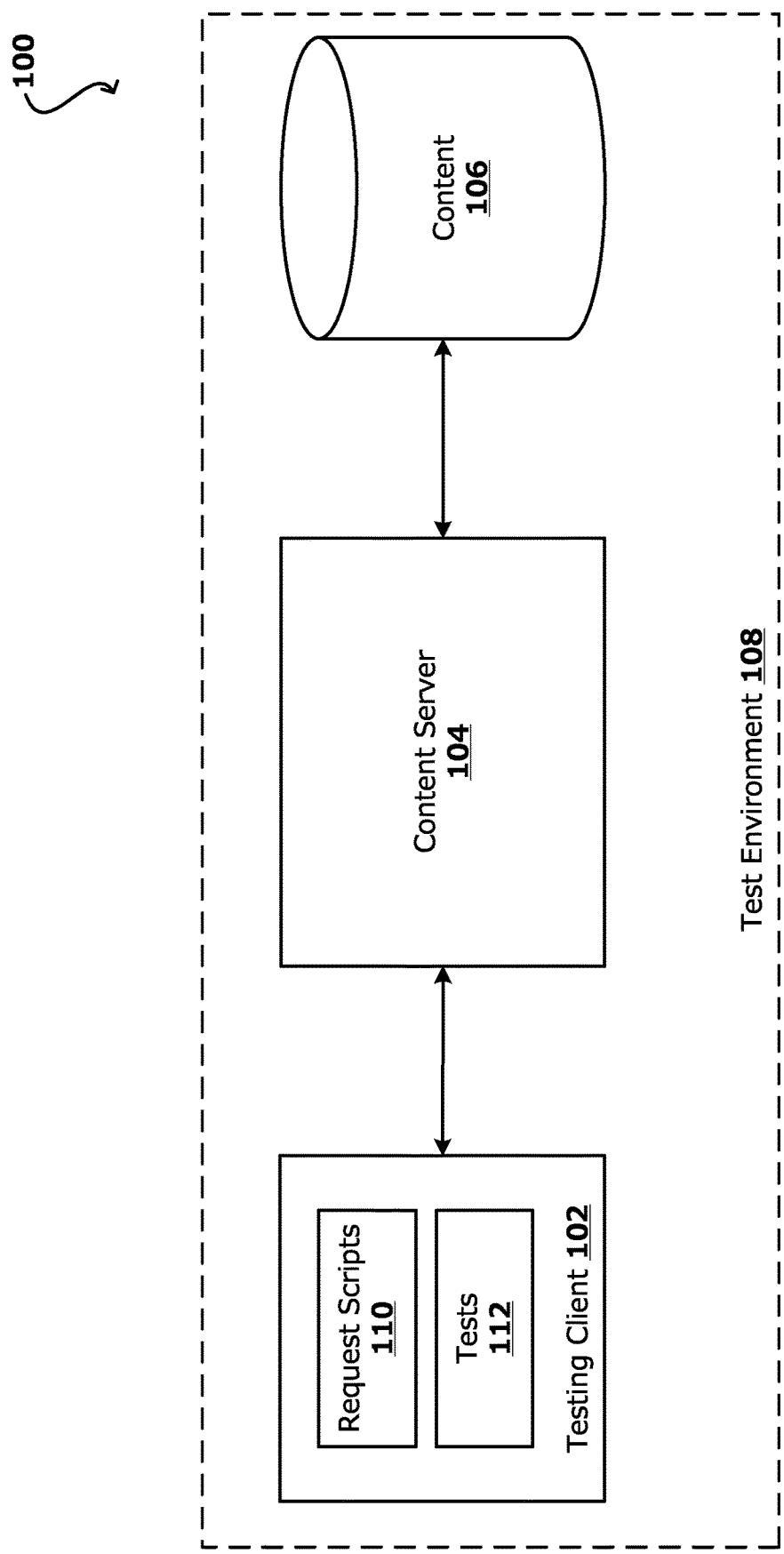
FIG. 1 a block diagram of a typical server testing framework in a testing environment.

FIG. 1 a block diagram 100 of a typical server testing framework in a testing environment. As discussed above, a traditional phased development and deployment approach includes multiple environments, from a development environment where one or more engineers produce an application or system to a testing environment where that application or system can be debugged before releasing the application or system to public users in a production environment. In the test environment, various aspects of the system can be tested, from basic functionality, to performance and quality assurance, before the system is deployed to a production environment where it receives requests from users.

As shown in FIG. 1, in a typical server testing framework a testing client 102 is used to test a content server 104. In this example, one or more users can request content 106 by sending a request to content server 104. Requests may be received from many different types of client devices, over different networks, through one or more intermediary servers, etc. and each request may request a different type of content, stored in different locations, having different characteristics, etc. To adequately test the content server, the various expected types of requests from expected client devices need to be processed by the content server 104. During the testing phase, testing client 102, content server 104, and content 106 are all executing or stored in a test environment 108. In test environment 108, the number of client devices with access to the content server and the types and amount of content are limited, providing a controlled environment for testing.

During testing, test client 102 can be configured with request scripts 110 and tests 112. Request scripts 110 can be run by test client 102 to generate a series of requests designed to simulate the sorts of requests the content server might receive from actual users when moved to the production environment. Based on responses received from the content server, testing client 102 can run a series of tests 112 to determine whether content server 104 is functioning as expected.

Unfortunately, traditional testing approaches require significant manual effort to design and write appropriate test scripts to cover the various scenarios needed to effectively test the system. Further, these approaches rely on the ability of developers to correctly predict the types of messages that will be received. This can result in both over-testing and under-testing the system. For example, if a number of request scripts and tests for device types that do not end up using the system once it is in production, then testing efforts have been wasted on testing scenarios that do not exist in practice. Similarly, if the developer fails to anticipate types of requests that the content server receives in production, then the system has been inadequately tested and may fail or perform unpredictably. Additionally, for high volume servers, the such testing approaches cannot simulate how the server will behave at load, when it is receiving potentially billions of requests. Because of the limitations of traditional testing frameworks, errors inevitably reach production leading to poorly performing systems.

Accordingly, approaches in accordance with the various embodiments provide techniques for real-time server testing in a production environment. Unlike traditional testing frameworks, embodiments of the present invention enable a server in production to be tested using live messages received from users. This eliminates the need to design and write test scripts to cover various scenarios and enables the server to be tested under live conditions. A test controller executing on the server under test can receive message attributes from a test client that define the types of messages to be used for a particular test. The test controller can identify live messages as they are received by the server that match the message attributes. The messages can be processed by the server in real time and then tested according to message tests received from the test client.

Figure 2:
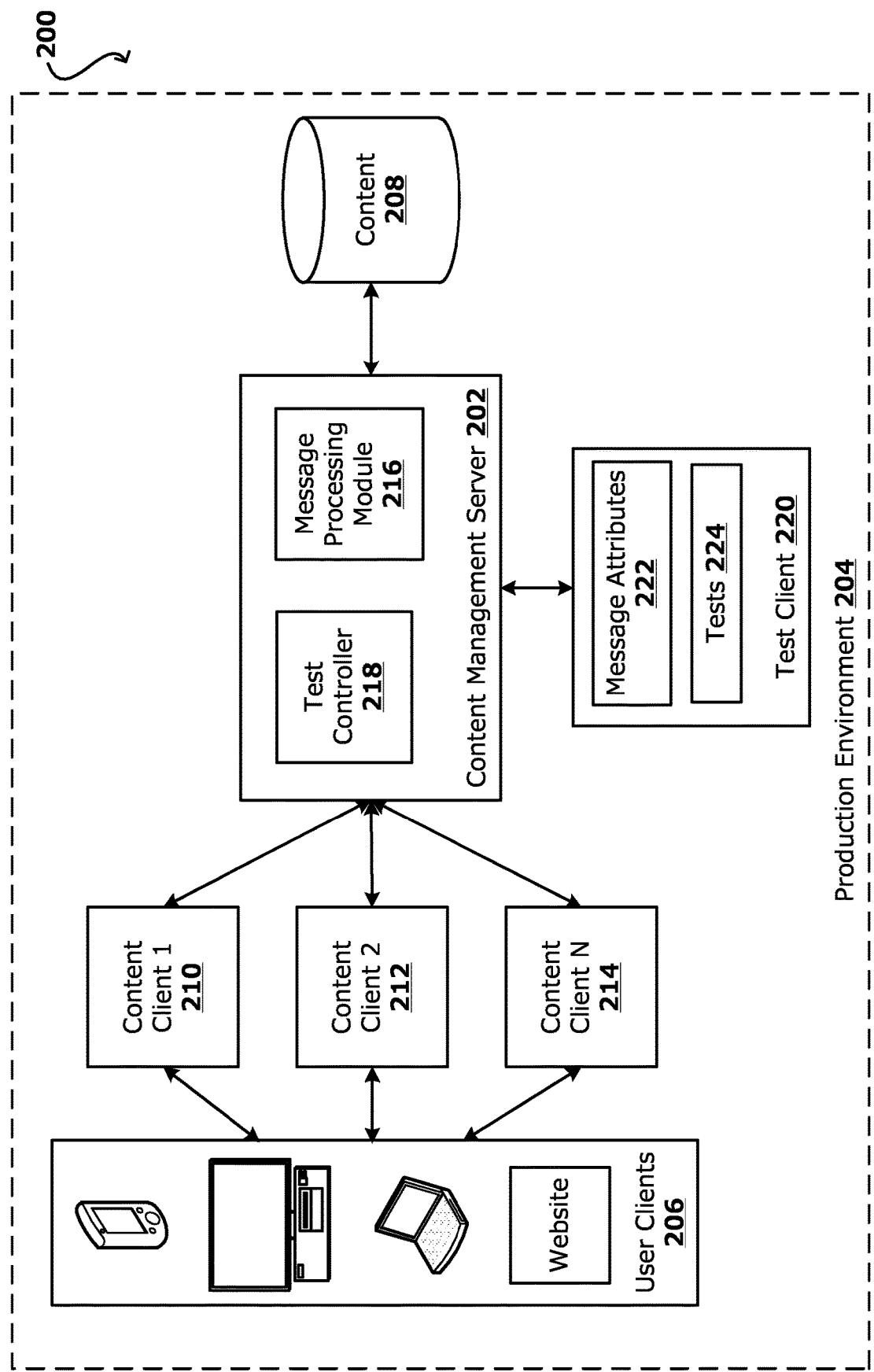
FIG. 2 illustrates a block diagram of an example server testing framework in a production environment, in accordance with an embodiment.

FIG. 2 illustrates a block diagram 200 of an example server testing framework in a production environment, in accordance with an embodiment. As shown in FIG. 2, a content management server 202 can be deployed to a production environment 204. Although embodiments of the present invention are described with respect to a content management server, this if for simplicity of description and is not intended to be limiting. The testing framework described herein may be similarly implemented to test other high traffic servers in a production environment. In production environment 204, content management server 202 is configured to receive and process requests from various user clients 206. Each client may represent a different user or entity, such as a website, content host, or other intermediary system, which is requesting content. In some embodiments, content requests can be sent from user clients 206 to content management server 202 through one or more content clients 210, 212, 214. Each content client can distribute content to various user clients. For example, each content client may represent a different content republisher that makes content 208 available from a content publisher to the user clients 206. Each content client 210, 212, 214 can receive requests from multiple clients.

When requests are received by content management server 202, one or more message processing modules 216 can process the requests. Requests from different client devices, browser types, users, content clients, etc. may each trigger different workflows that are executed by message processing module 216. This can lead to a very large number of potential use cases that need to be tested on an on-going basis. As such, each server instance, such as content management server 202, can be modified to include test controller 218. Test controller 218 can monitor requests (or other messages) as they are received in real time. Since these are requests in the production environment 204, the requests are not simulated but originate at actual user client devices 206. Additionally, by testing in production environment 204, the server can be tested under the actual production conditions (e.g., production level request load, network noise, etc.).

Test controller 220 can query each message as it is received to identify message attributes (e.g., sender/device identifier, destination identifier, content client identifier, etc.). Using the message attributes 222 received from test client 220, matching messages can be identified which may be used to test content management server 202. This way, message attributes 222 can define the types of messages used for a particular test 224, eliminating the need to manually write scripts to generate simulated messages, as is done in traditional testing frameworks. Additionally, by using actual messages, if messages are not identified that match the specified attributes 222, that can be used to identify other potential system problems. For example, if messages from a particular device type cannot be identified, there may be an error in a communication channel or interface that is specific to that device type. A traditional test environment likely would not have identified such an error. Alternatively, if no such error is detected, a lack of matching messages may indicate that the system is not receiving those messages because it is not being used as predicted. As such, the labor that would have been required to design and test the system for that predicted use is saved.

In some embodiments, tests 224 can be written as statements to be applied to messages matching message attributes 222. For example, message attributes may include a device identifier and a content client identifier and the test may check whether a request was sent by the content management server to a content store 208. In some embodiments, test attributes may indicate that N number of messages matching the message attributes should be tested before determining whether the test was successful. The test attributes may also indicate a range of message attributes that should be iterated for a given test. For example, a test can be defined to be run for each of M number of device identifiers for a given content client. Test controller 218 may then iterate through the M device identifiers. Similarly, tests may be defined to determine whether a whitelist or blacklist is operating correctly. For example, such a test can be represented by the statement "identify requests having device code X [the message attribute] and determine whether the request was sent to a content store [test 1] and a response was received [test 2]. Repeat for all device codes [test attribute]." Thus, through simple declarative statements, many thousands of unique tests can be defined without requiring any scripts be written or simulated messages generated.

In some embodiments, each test 224 can be applied to a message trace associated with each request. The message trace can indicate how the message was processed by content management server 202 (e.g., where was the message sent, was a response generated, how and where was the message logged, etc.). When a test is applied to a given message, the message trace associated with that message can be retrieved and the test compared to the attributes in the trace. For example, using the test statement described above "determine whether the request was sent to a content store and a response was received," the test controller can determine whether the message trace includes sending the message to a content store (e.g., based on device address) and whether a response from the store was received. In some embodiments, log information associated with a message can be retrieved and it can be determined whether the log is formatted to be compatible with the message. In some embodiments a consistency check can be applied to a message trace (e.g., to determine whether a response was generated for a given message).

Figure 3:
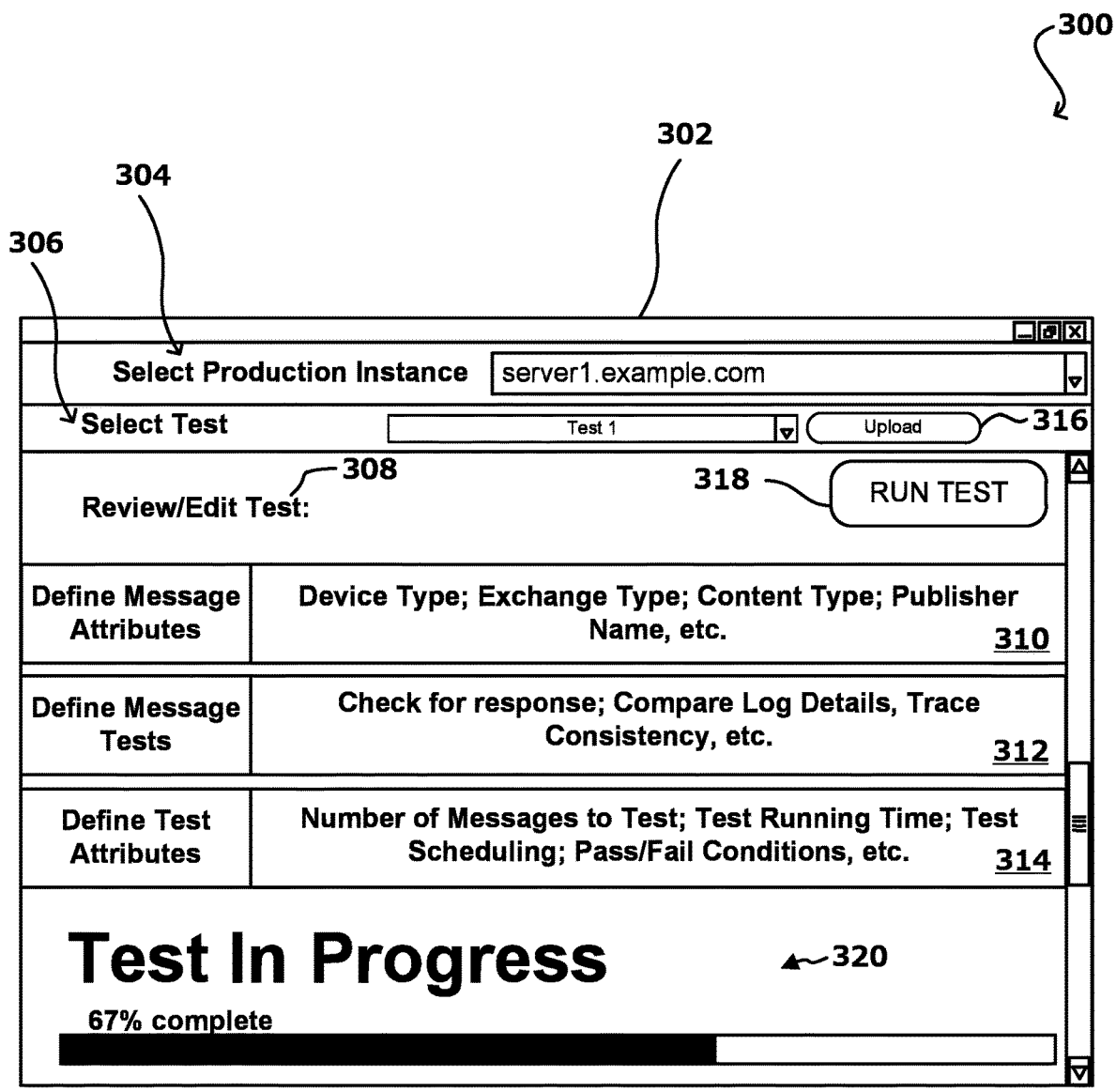
FIG. 3 illustrates an example interface of an example test console, in accordance with an embodiment.

FIG. 3 illustrates an example interface 300 of an example test console, in accordance with an embodiment. As described above, test client 216 can include a user interface to facilitate sending and updating message attributes, running tests, receiving test results, etc. As shown in FIG. 3, one such user interface is a test console 302. Test console 302 can enable a user, such as an administrator, to select 304 a production server instance to test. In some embodiments, the production server instance may be randomly selected without user input. In some embodiments, multiple server instances may be selected and tested substantially simultaneously, sequentially, or in a user-defined order.

Test console 302 can further enable a user to select 306 a test. The user can select from previously defined tests or can define a new test. Once selected the details of the test can be shown in Review/Edit Test pane 308. The user can define message attributes 310 for the test. As discussed, the message attributes describe characteristics of the messages the test will use, the message attributes can include device type content client type, content type, publisher name, etc. The message attributes can also include ranges for each condition, for example a list of device types, a list of content types, a range of addresses of content stores, etc. The user can also define message tests 312. As discussed, the message tests can include checking for a response, analyzing log details, checking for trace consistency, and other tests to determine whether the server is processing messages as intended. The user can also define test attributes 314. The test attributes can include various test thresholds such as a number of messages to test, a number of messages to test for a particular message attribute, how long to run the test, when to run the test, pass/fail conditions, etc. As discussed, pass/fail conditions can include aggregated pass/fail conditions. For example, for a particular test to be passed, 1000 messages must each pass the particular test, or 75% of messages tested must pass the particular test.

Once the test has been defined, the user can upload 316 the test to the selected production instance. When the user instructs the test client 220 to upload the selected test, the test client can connect to the test controller 218 and upload the message attributes 310 associated with the test. In some embodiments the test client 220 can also upload the message tests associated with the selected test, enabling the message testing to be performed by the test controller. Once the test is uploaded, the user can begin the test by selecting Run Test 318 or otherwise instructing the test controller to begin the test. In some embodiments, the test controller 218 can return message traces associated with each matching message to the test client, the test client may then test the received message traces using the message tests associated with the test. Testing can continue until the test is complete, based on the test attributes (e.g., the requested number of message have been tested, a timeout has occurred, etc.). As shown at 320, test console 302 can include a visualization that indicates the progress of the test.

In some embodiments, test console 302 can be implemented using a real-time JMX/SQS framework. In some embodiments, alternative real time frameworks may be used. Test results can be stored in a database, table, or other data structure along with a description of the test, enabling administrators or other test operators to determine any changes that need to be made to the server based on the test results. In some embodiments, each test 224 can be written as a JavaScript file although alternative scripting languages may also be used.

Although a single test console 302 interface is shown in FIG. 3, the functionality described herein may be distributed across multiple interfaces. For example, a first interface may be a test editor interface that includes Review/Edit Test pane 308 and a second interface may be a test execution interface that enables currently defined tests to be uploaded and executed. In some embodiments, a third interface may be a single test interface that includes Select Test 306, Run Test 318, and Test Progress visualization 320.

Figure 4:
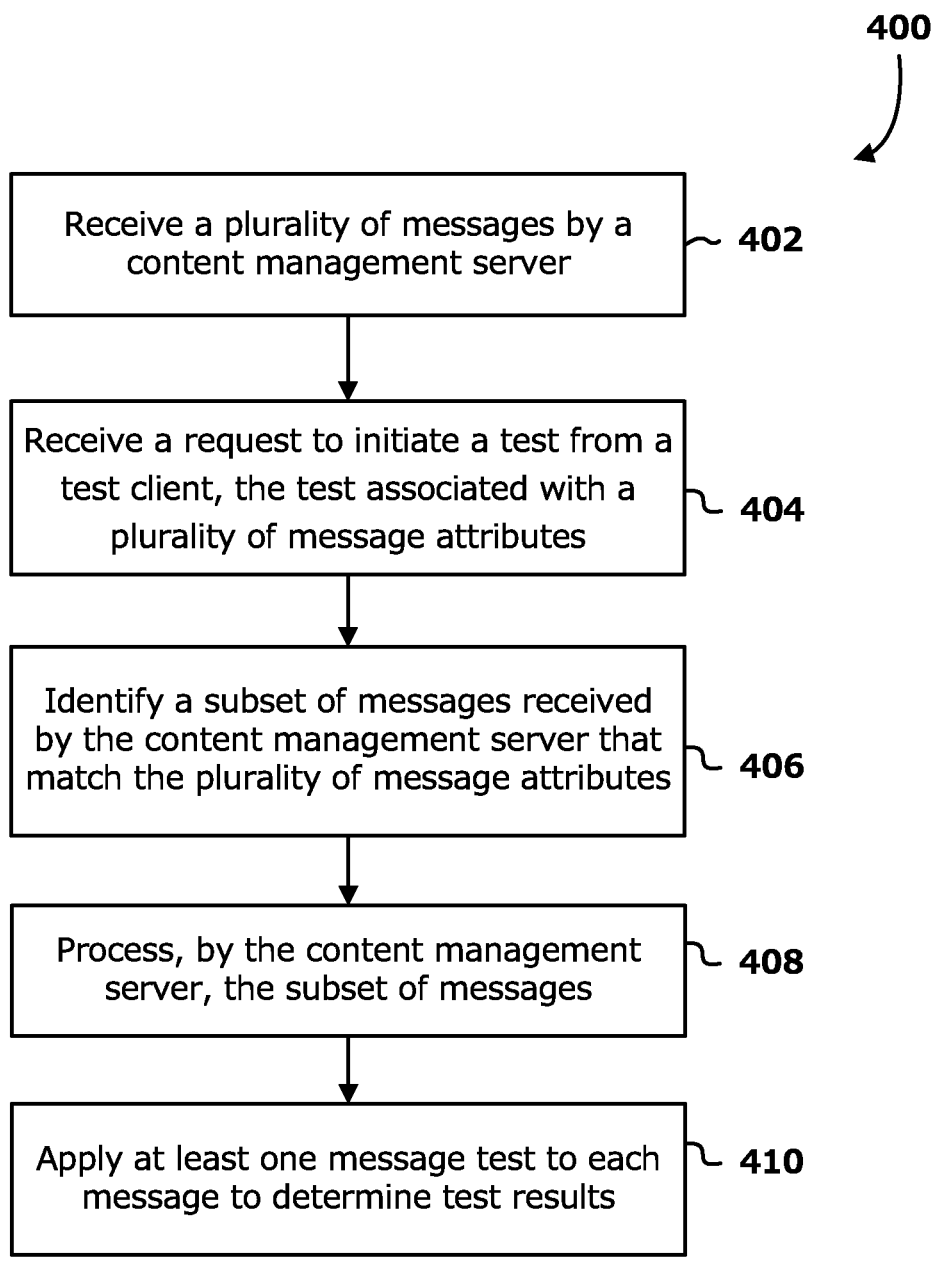
FIG. 4 illustrates a method of server testing in a production environment, in accordance with an embodiment.

FIG. 4 illustrates a method 400 of server testing in a production environment, in accordance with an embodiment. In this example, messages can be received 402 by a content management server. The messages can be requests for content available through the content management server and may be received directly from client devices (e.g., consumer devices, web servers, web sites, or other system that consumes and/or republished content). In some embodiments, messages may be received indirectly through a content client server or other message proxy system. As discussed above, the content management server can be deployed to a production environment and the messages can be "live" messages received from users, rather than being simulated messages received from a test system.

In some embodiments, the content management server can receive 404 an instruction to being a test from a test client. In some embodiments, the message attributes can be received by a test controller executing on the content management server. The message attributes can be uploaded to the test controller before tests are initiated by the test client. For example, a test setup operation can be performed regularly (e.g., once a day, once a week, etc.) in which tests are uploaded from the test client or test clients to the test controller. This way currently defined tests can be performed on demand, without requiring message attributes and test conditions to be uploaded when a given test is executed. As discussed above, the message attributes can include a device type, content client name, content type requested, or other message and/or sender attributes. The test client can include a test console through which an administrator can define the message attributes and upload the message attributes to the test controller.

The content management server can identify 406 a subset of messages based on the plurality of message attributes. The subset of messages can be identified in real time as messages are received. In some embodiments, the test controller can identify the messages by querying message as they are received by the content management server to determine message attributes. The test controller can compare the message attributes to the message attributes to identify the subset of messages that match the message attributes.

As discussed, the content management server is deployed in a production environment. Accordingly, each message received is a live message from a client system and testing is performed as the messages are received. The content management server can process 408 each message from the subset of messages. This may include, e.g., retrieving a particular content item responsive to the request, generating a response that includes the particular content item (or a link to the particular content item), and returning the response to the requesting client device and/or content client server. As each message is processed, a message trace is generated. The message trace includes attributes that indicate how the message was processed.

One or more message tests may be applied 410 to each message in the subset of messages to determine test results. In some embodiments, applying the message tests may include retrieving a message trace corresponding to each message and comparing test conditions corresponding to the message test to each message trace. In some embodiments each message test may be applied to messages in real time as the messages are processed.

In some embodiments, message tests may define a range of message attributes that are to be tested before the message test is complete. For example, one condition of a message test may specify a range of device types to be tested. The test may be applied by iterating through matching messages until a message from each device type is identified and tested or until a timeout condition has been detected. In some embodiments, one or more message thresholds may be defined for a message test. For example, the message test described above may require that 1000 messages from each device type be tested before the test is complete. In some embodiments, the test results may then be aggregated to determine an aggregate test result for the request test. For example, a passage rate may be determined across 1000 matching messages. The test controller may then determine whether the test has been passed or failed based on the aggregate test result. For example, the passage rate may be compared to a threshold passage rate defined in the message test. The test results (or aggregate test results) and a description of the message test may be stored in a test log. The test log may be stored by the test controller, the test client, or other system in communication with the test controller.

In some embodiments, message attributes may be updated using the test console. The updated message attributes can be uploaded from the test client to the test controller and used to identify messages that match the updated message attributes. The same or updated message tests may then be applied to the messages that matches the updated message attributes. Message attributes and message tests may be updated without requiring the content management server under test or the test client to be taken offline, reconfigured, recompiled, or otherwise taken out of production.

Some or all of process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 5:
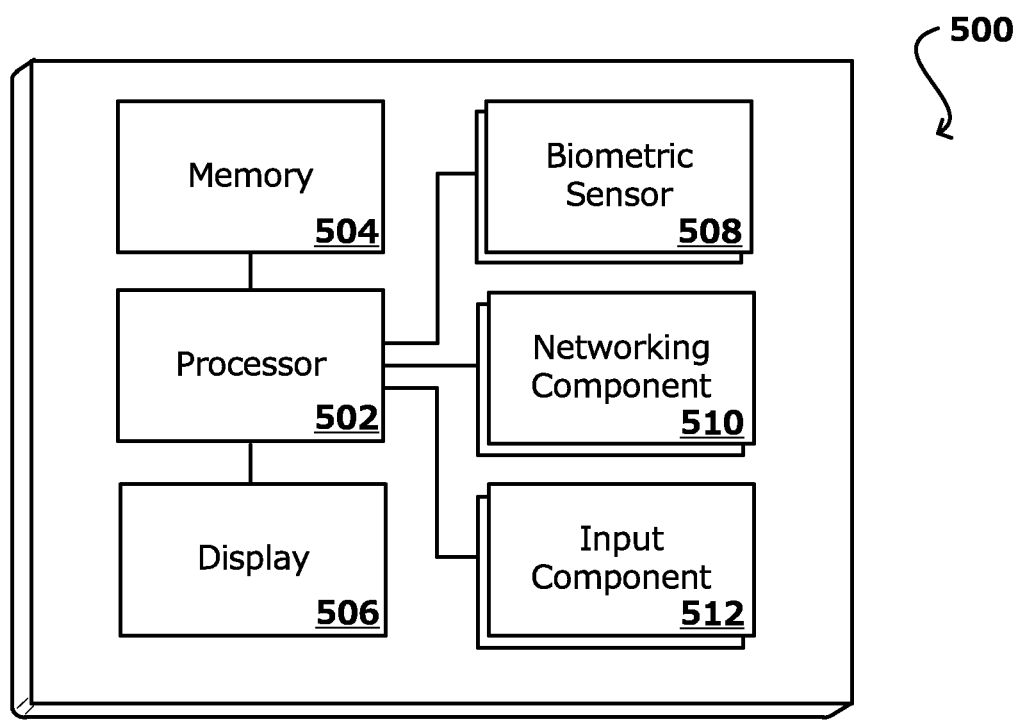
FIG. 5 illustrates example components of a computing device.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments may include at least one biometric sensor 508 such as a camera, retina scanner, fingerprint scanner, or other biometric sensor that is able to capture biometric data associated with one or more users in the vicinity of the device. Methods for capturing biometric data using a biometric sensor with a computing device are well known in the art and will not be discussed herein in detail. The device can include the ability to start and/or stop biometric data capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices. The audio capture component may be used to capture audio biometric data, such as a voice print or other voice data from a user.

In some embodiments, the computing device 500 of FIG. 5 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input component 512 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 500 also can include at least one orientation or motion sensor or component 510. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 502, whereby the device can perform any of a number of actions described or suggested herein.

As an example, a computing device such as that described with respect to FIG. 5 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 6:
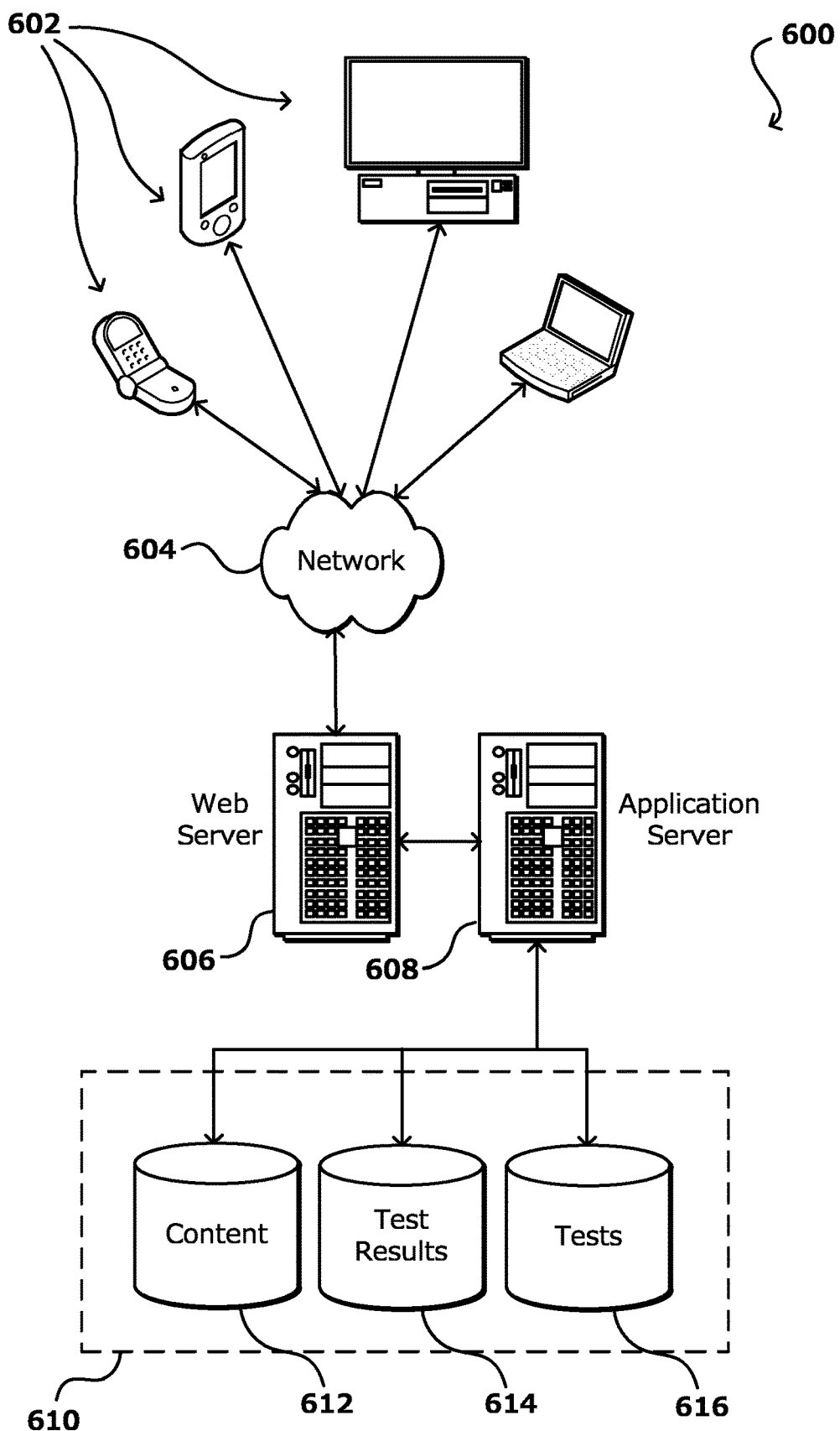
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content 612, test results 614, and tests 616. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at a server deployed to a production environment, a plurality of messages transmitted by at least one user client device, each message of the plurality of messages having a plurality of message attributes including a device identifier and a content identifier;
   defining, at a server deployed to a test environment different from the production environment, a first message attribute of the plurality of message attributes that indicates a message having the first message attribute is to be used for a test, the server deployed to the test environment different from the user client device;
   processing, at the server deployed to the production environment, a subset of the plurality of messages having the first message attribute; and
   applying the test to each message in the subset of messages.

2. The computer-implemented method of claim 1, further comprising:
   identifying the subset of messages as the plurality of messages are received.

3. The computer-implemented method of claim 1, further comprising:
   receiving the plurality of messages transmitted by a plurality of user client devices.

4. The computer-implemented method of claim 1, further comprising:
   receiving the plurality of messages from a plurality of message proxy systems.

5. The computer-implemented method of claim 4, wherein the message attribute is one of the device identifier, a message proxy system identifier, and the content identifier.

6. The computer-implemented method of claim 1, further comprising:
   determining that a threshold number of messages from the subset of messages have been processed; and
   determining an aggregate test result for the test.

7. The computer-implemented method of claim 1, further comprising:
   retrieving a plurality of message traces, each message trace associated with a message from the subset of messages; and
   comparing at least one test condition associated with the test to each message trace to determine a plurality of test results.

8. The computer-implemented method of claim 1, further comprising:
   receiving a request to initiate the test.

9. A computer-implemented method, comprising:
   receiving, by a server deployed to a production environment, a plurality of messages transmitted by at least one user client device, each message of the plurality of messages having a plurality of message attributes including a device identifier and a content identifier;
   receiving, by the server and from a test controller deployed to a test environment different from the production environment, information associated with a test including a first message attribute of the plurality of message attributes that indicates a message having the first message attribute is to be used for the test;
   processing, by the server, a subset of the plurality of messages having the first message attribute; and
   applying the test to each message in the subset of messages.

10. The computer-implemented method of claim 9, wherein the information associated with the test is received by the test controller from a test client.

11. The computer-implemented method of claim 10, further comprising:
    receiving the plurality of message attributes associated with the plurality of messages from a test console executing on the test client.

12. The computer-implemented method of claim 9, wherein the test defines a plurality of message sources to be tested and a threshold number of messages is tested for each of the plurality of message sources.

13. A system, comprising:
    at least one processor; and
    memory storing instructions that, when executed by the at least one processor, cause the system to:
      receive, at a server deployed to a production environment, a plurality of messages transmitted by at least one user client device, each message of the plurality of messages having a plurality of message attributes including a device identifier and a content identifier;
      define, at a server deployed to a test environment different from the production environment, a first message attribute of the plurality of message attributes that indicates a message having the first message attribute is to be used for a test, the server deployed to the test environment different from the user client device;
      process, at the server deployed to the production environment, a subset of the plurality of messages having the first message attribute; and
      apply the test to each message in the subset of messages.

14. The system of claim 13, wherein the instructions, when executed by the at least one processor, further cause the system to:
    identify the subset of messages as the plurality of messages are received.

15. The system of claim 13, wherein the instructions, when executed by the at least one processor, further cause the system to:

receive the plurality of messages transmitted by a plurality of user client devices.

16. The system of claim 13, wherein the instructions, when executed by the at least one processor, further cause the system to:
receive the plurality of messages from a plurality of message proxy systems.

17. The system of claim 16, wherein the message attribute is one of the device identifier, a message proxy system identifier, and the content identifier.

18. The system of claim 13, wherein the instructions, when executed by the at least one processor, further cause the system to:
determine that a threshold number of messages from the subset of messages have been processed; and
determine an aggregate test result for the test.

19. The system of claim 13, wherein the instructions, when executed by the at least one processor, further cause the system to:
retrieve a plurality of message traces, each message trace associated with a message from the subset of messages; and
compare at least one test condition associated with the test to each message trace to determine a plurality of test results.

20. The system of claim 13, wherein the instructions, when executed by the at least one processor, further cause the system to:
receive a request to initiate the test.

* * * * *